United States Patent
Lin Chou et al.

(10) Patent No.: US 12,456,805 B2
(45) Date of Patent: Oct. 28, 2025

(54) MOTOR SYSTEM FOR REMOTE ELECTRONIC TILT ANTENNAS AND METHODS FOR CONTROLLING SAME

(71) Applicant: Outdoor Wireless Networks LLC, Claremont, NC (US)

(72) Inventors: Chih Lin Lin Chou, Allen, TX (US); Deepali A. Limaye, Frisco, TX (US); Edward Strehle, Allen, TX (US)

(73) Assignee: OUTDOOR WIRELESS NETWORKS LLC, Richardson, TX (US)

(*) Notice: Subject to any disclaimer, the term of this patent is extended or adjusted under 35 U.S.C. 154(b) by 378 days.

(21) Appl. No.: 18/315,248

(22) Filed: May 10, 2023

(65) Prior Publication Data

US 2023/0387590 A1 Nov. 30, 2023

Related U.S. Application Data

(60) Provisional application No. 63/345,540, filed on May 25, 2022.

(51) Int. Cl.
| | |
|---|---|
| *H01Q 3/32* | (2006.01) |
| *G01D 5/14* | (2006.01) |
| *H01Q 1/24* | (2006.01) |
| *H02P 6/16* | (2016.01) |

(52) U.S. Cl.
CPC ............ *H01Q 3/32* (2013.01); *G01D 5/145* (2013.01); *H02P 6/16* (2013.01); *H01Q 1/246* (2013.01)

(58) Field of Classification Search
CPC .......... H01Q 3/32; H01Q 1/246; G01D 5/145; H02P 6/16
See application file for complete search history.

(56) References Cited

U.S. PATENT DOCUMENTS

| | | | |
|---|---|---|---|
| 2002/0152821 A1* | 10/2002 | Strothmann | G01L 3/104 73/862.332 |
| 2007/0290935 A1* | 12/2007 | Franzon | H01Q 3/32 343/757 |
| 2012/0032629 A1* | 2/2012 | Peterson | H02P 6/22 318/723 |

* cited by examiner

*Primary Examiner* — Stephanie E Bloss
*Assistant Examiner* — Michael A Harrison
(74) *Attorney, Agent, or Firm* — Myers Bigel, P.A.

(57) ABSTRACT

The present disclosure is directed to motor system for a multi-RET actuator system. The motor system includes a rotor configured to rotate within an interior cavity of a stator, a drive shaft coupled to the rotor and to a drive assembly of the multi-RET actuator system, an annular disc surrounding the stator, the annular disc is coupled to the rotor such that rotation of the rotor causes simultaneous rotation of the annular disc, a plurality of spaced apart magnets embedded within the annular disc, a HALL effect sensor, and a motor speed controller in communication with the rotor and the HALL effect sensor. Methods for controlling the position and speed of a motor system are also described herein.

21 Claims, 11 Drawing Sheets

MOTOR SYSTEM FOR REMOTE ELECTRONIC TILT ANTENNAS AND METHODS FOR CONTROLLING SAME

RELATED APPLICATION(S)

The present application claims priority from and the benefit of U.S. Provisional Patent Application Ser. No. 63/345,540, filed May 25, 2022, the disclosure of which is hereby incorporated herein in its entirety.

FIELD

The present invention relates to communication systems, and in particular, to a motor system for remote electronic tilt (RET) antennas and methods for controlling the position and speed of the motor system.

BACKGROUND

Cellular communications systems are used to provide wireless communications to fixed and mobile subscribers. A cellular communications system may include a plurality of base stations that each provide wireless cellular service for a specified coverage area that is typically referred to as a "cell." Each base station may include one or more base station antennas that are used to transmit radio frequency ("RF") signals to, and receive RF signals from, the subscribers that are within the cell served by the base station. Base station antennas are directional devices that can concentrate the RF energy that is transmitted in or received from certain directions. The "gain" of a base station antenna in a given direction is a measure of the ability of the antenna to concentrate the RF energy in that direction. The "radiation pattern" of a base station antenna—which is also referred to as an "antenna beam"—is a compilation of the gain of the antenna across all different directions. Each antenna beam may be designed to service a pre-defined coverage area such as the cell or a portion thereof that is referred to as a "sector." Each antenna beam may be designed to exceed minimum gain levels throughout the pre-defined coverage area, and to have much lower gain levels outside of the coverage area to reduce interference between neighboring cells/sectors. Base station antennas typically comprise linear or planar arrays of radiating elements such as patch, dipole or crossed dipole radiating elements. Many base station antennas now include multiple arrays of radiating elements, each of which generates its own antenna beam.

Early base station antennas generated antenna beams having fixed shapes, meaning that once a base station antenna was installed, its antenna beam(s) could not be changed unless a technician physically reconfigured the antenna. Many modern base station antennas now have antenna beams that can be electronically reconfigured from a remote location. The most common way in which an antenna beam may be reconfigured electronically is to change the pointing direction of the antenna beam (i.e., the direction in which the antenna beam has the highest gain), which is referred to as electronically "steering" the antenna beam. An antenna beam may be steered horizontally in the azimuth plane and/or vertically in the elevation plane. An antenna beam can be electronically steered by transmitting control signals to the antenna that cause the antenna to alter the phases of the sub-components of the RF signals that are transmitted and received by the individual radiating elements of the array that generates the antenna beam. Most modern base station antennas are configured so that the elevation or "tilt" angle of the antenna beams generated by the antenna can be electronically altered. Such antennas are commonly referred to as remote electronic tilt ("RET") antennas.

In order to electronically change the down tilt angle of an antenna beam generated by a linear array of radiating elements, a phase progression may be applied across the radiating elements of the array. Such a phase progression may be applied by adjusting the settings on a phase shifter that is positioned along the RF transmission path between a radio and the individual radiating elements of the linear array. One widely-used type of phase shifter is an electro-mechanical "wiper" phaseshifter that includes a main printed circuit board and a "wiper" printed circuit board that may be rotated above the main printed circuit board. Such wiper phase shifters typically divide an input RF signal that is received at the main printed circuit board into a plurality of sub-components, and then couple at least some of these sub-components to the wiper printed circuit board. The sub-components of the RF signal may be coupled from the wiper printed circuit board back to the main printed circuit board along a plurality of concentric arc-shaped traces, where each arc has a different diameter. Each end of each arc-shaped trace may be connected to a respective sub-group of radiating elements that includes at least one radiating element. By physically (mechanically) rotating the wiper printed circuit board above the main printed circuit board, the locations where the sub-components of the RF signal couple back to the main printed circuit board may be changed, which thus changes the lengths of the transmission paths from the phase shifter to the respective sub-groups of radiating elements. The changes in these path lengths result in changes in the phases of the respective sub-components of the RF signal, and since the arcs have different radii, the phase changes along the different paths will be different. Typically, the phase progression is applied by applying positive phase shifts of various magnitudes (e.g., $+X°$, $+2X°$ and $+3X°$) to some of the sub-components of the RF signal and by applying negative phase shifts of the same magnitudes (e.g., $-X°$, $-2X°$ and $-3X°$) to additional of the sub-components of the RF signal. The wiper printed circuit board is typically moved using an electromechanical actuator such as a direct current (DC) motor that is connected to the wiper printed circuit board via a mechanical linkage. These actuators are often referred to as "RET actuators." Both individual RET actuators that drive a single mechanical linkage and "multi-RET actuators" that have a plurality of output members that drive a plurality or respective mechanical linkages are commonly used in base station antennas.

In most instances, the DC motor includes a HALL effect sensor. The HALL effect sensor produces a step voltage when it detects the passing of rotating flywheel magnets coupled to the rotor of the motor and is used for positioning and speed detection. In some instances, as the rotor coasts and slows down after the motor is de-energized at high speeds, a reverse rotation of the rotor may occur when rotor realigns with the stator magnet poles. This reverse rotation can generate a false HALL "step" which can cause position inaccuracies with respect to the phase shift assembly being adjusted.

SUMMARY

A first aspect of the present invention is directed to a method of controlling the position and speed of a motor system for a multi-RET actuator system. The multi-RET actuator system includes a plurality of drive assemblies, each drive assembly operatively connected to a phase shifter assembly such that movement of the drive assembly adjusts the respective phase shifter assembly, a direct current motor system coupled to the plurality of drive assemblies, the motor system comprising a rotor configured to rotate within an interior cavity of a stator, a drive shaft coupled to the rotor and to the plurality of drive assemblies, an annular disc surrounding the stator, the annular disc is coupled to the rotor such that rotation of the rotor causes simultaneous rotation of the annular disc, a plurality of spaced apart magnets embedded within the annular disc, and a HALL effect sensor. The method includes accelerating rotation of the rotor and annular disc to move a selected drive assembly of the plurality of drive assemblies a total travel distance to reach a target position; monitoring a step voltage produced by the HALL effect sensor as the annular disc and plurality of magnets rotate past the HALL effect sensor; decelerating rotation of the rotor and annular disc; measuring the step voltage produced by the HALL effect sensor to determine if a counter-rotation of the rotor is detected after the rotor comes to a complete stop; and subtracting a distance added by the counter-rotation of the rotor from the total travel distance for the selected drive assembly to reach the target position.

Another aspect of the present invention is directed to a method for controlling the position and speed of a motor system for a multi-RET actuator system. The multi-RET actuator system includes a plurality of drive assemblies, each drive assembly operatively connected to a phase shifter assembly such that movement of the drive assembly a total travel distance adjusts the respective phase shifter assembly to a target position, a direct current motor system coupled to the plurality of drive assemblies, the motor system comprising a rotor configured to rotate within an interior cavity of a stator, a drive shaft coupled to the rotor and to the plurality of drive assemblies, an annular disc surrounding the stator, the annular disc is coupled to the rotor such that rotation of the rotor causes simultaneous rotation of the annular disc, a plurality of spaced apart magnets embedded within the annular disc, and a HALL effect sensor. The method includes calculating a first intermediate distance and a second intermediate distance relative to the total travel distance of a selected drive assembly of the plurality of drive assemblies; accelerating rotation of the rotor and annular disc to move the selected drive assembly of the plurality of drive assemblies within the first intermediate distance; counting a step voltage produced by the HALL effect sensor as the rotor and annular disc rotate past the HALL effect sensor to calculate a current travel distance of the selected drive assembly; decelerating rotation of the rotor and annular disc when the current travel distance of the selected drive assembly reaches the second intermediate distance; calculating a deadband region relative to the total travel distance of the selected drive assembly; shutting down the motor system when the total travel distance of the selected drive assembly is within the dead-band region; measuring the step voltage produced by the HALL effect sensor to determine if a counter-rotation of the rotor is detected after the rotor comes to a complete stop; and subtracting a distance added by the counter-rotation of the rotor from the total travel distance for the selected drive assembly to reach the target position.

Another aspect of the present invention is directed to a motor system for a multi-RET actuator system. The motor system includes a rotor configured to rotate within an interior cavity of a stator, the rotor including armature windings and the stator comprises field windings, a drive shaft coupled to the rotor and to a drive assembly of the multi-RET actuator system, an annular disc surrounding the stator, the annular disc is coupled to the rotor such that rotation of the rotor causes simultaneous rotation of the annular disc, a plurality of spaced apart magnets embedded within the annular disc, a HALL effect sensor, and a motor speed controller in communication with the rotor and the HALL effect sensor. The motor speed controller includes a proportional integral derivative (PID) speed controller configured to control a PWM output to the rotor; an edge detector in communication with the HALL effect sensor to detect when the magnets rotate past the HALL effect sensor, and a step counter configured to count a step voltage produced by the HALL effect sensor.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim, accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1A:
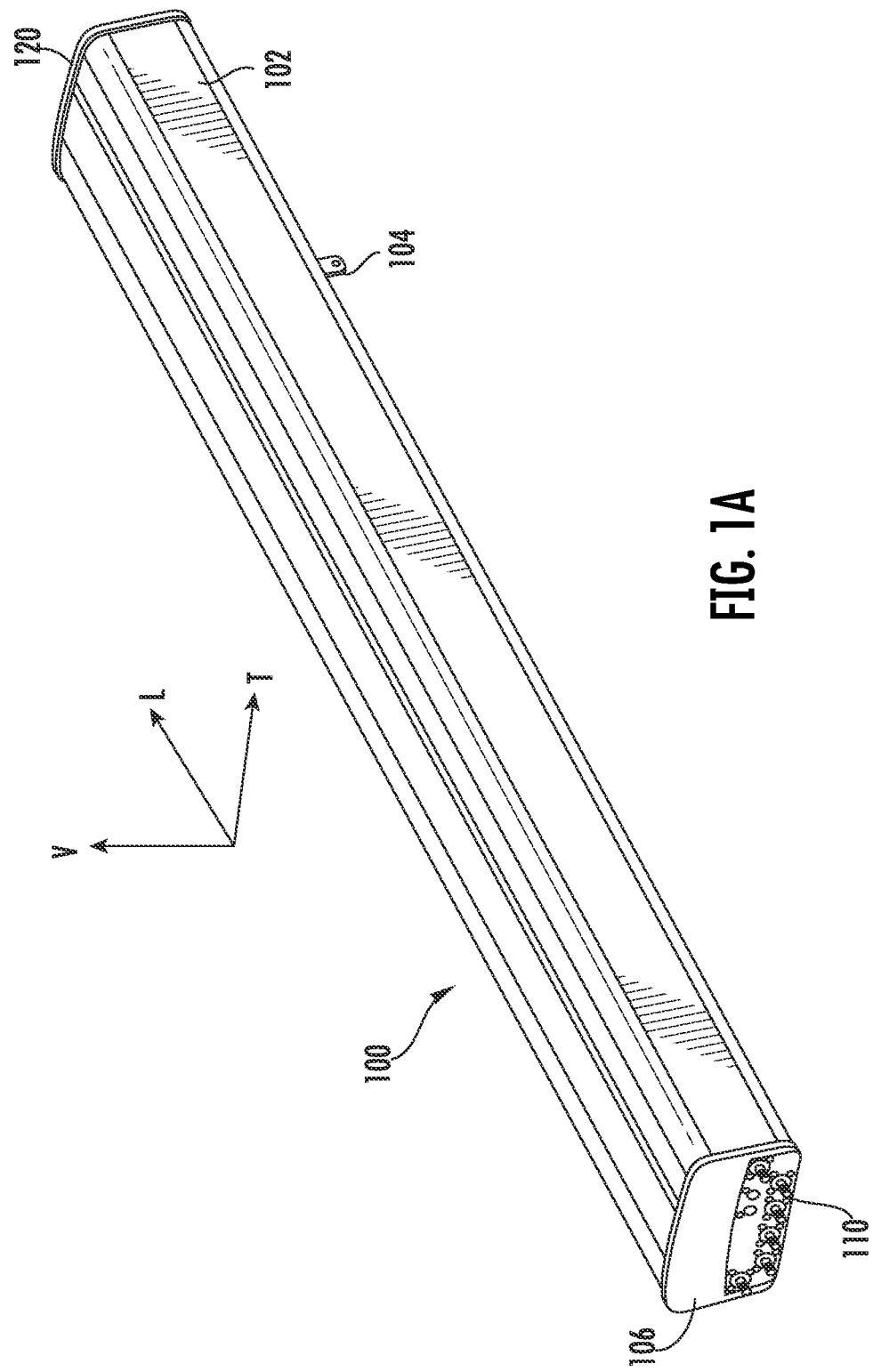
FIG. 1A is a perspective view of an example base station antenna according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Because the adjustment of the phase shifter requires precise movement, the accuracy of the RET actuator must be controlled in order to ensure that the downtilt angle of the antenna beam is correct. Typically, the motor coupled to the RET actuator is driven at higher speeds in order to perform the phase shifter adjustment within the two minute industry standard for maximum movement time such as described in the 3$^{rd}$ Generation Partnership Project (3GPP) and the Antenna Interface Standards Group (AISG). In some instances, certain interactions between the rotor and the Hall effect sensor within the motor system may cause position inaccuracies to occur with respect to the phase shifter adjustment. Embodiments of the present invention provide for methods of controlling the position and loading of the motor system to mitigate or eliminate these position inaccuracies.

Embodiments of the present invention will now be discussed in greater detail with reference to the drawings. In some cases, two-part reference numerals are used in the drawings. Herein, elements having such two-part reference numerals may be referred to individually by their full reference numeral (e.g., linear array 120-2) and may be referred to collectively by the first part of their reference numerals (e.g., the linear arrays 120).

Figure 1B:
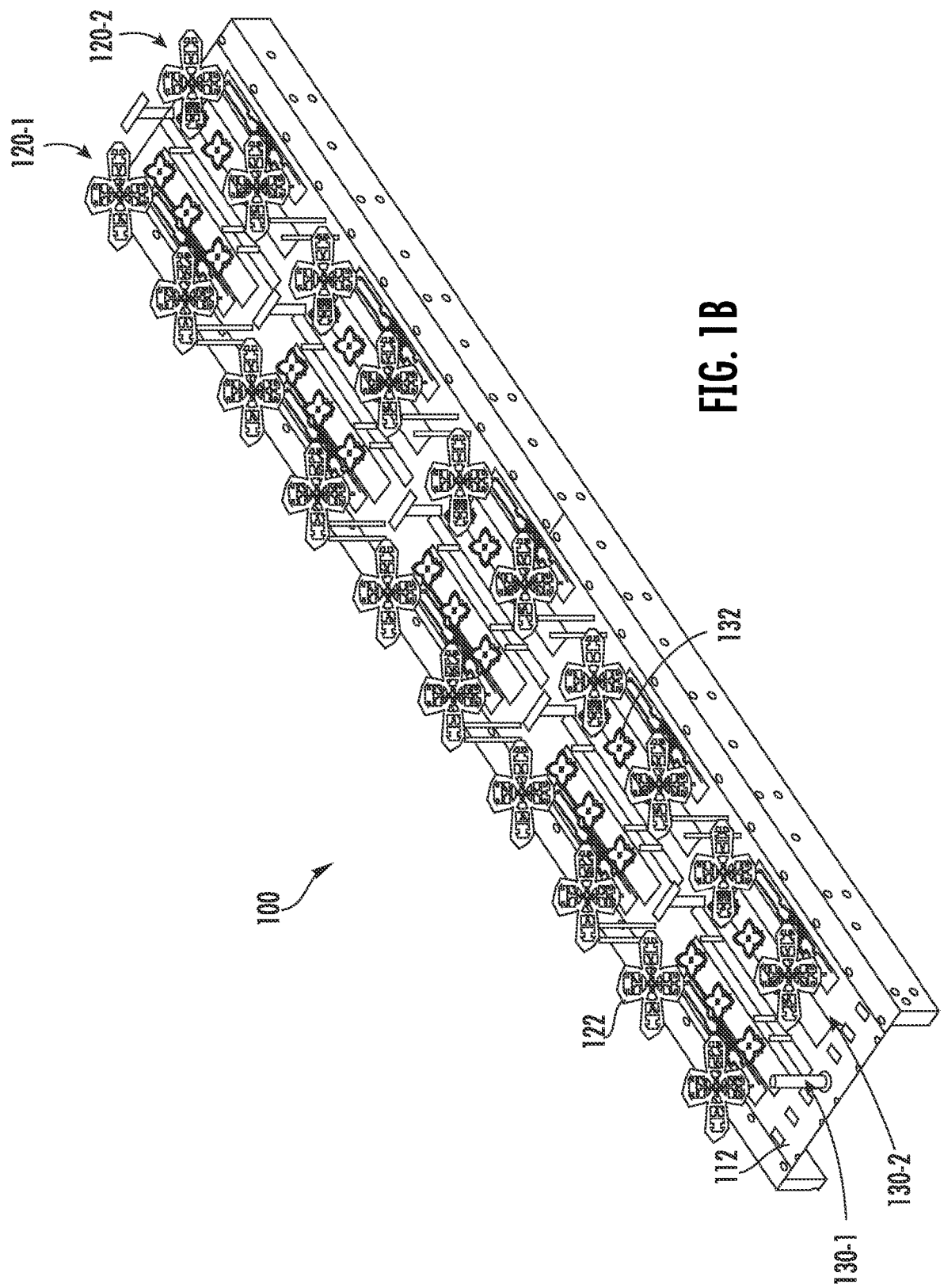
FIG. 1B is a perspective view of the base station antenna of FIG. 1A with the radome thereof removed.

FIG. 1A is a perspective view of a RET base station antenna 100 according to embodiments of the present invention. FIG. 1B is a perspective view of the base station antenna 100 with the radome removed to show the four linear arrays of radiating elements that are included in antenna 100. While FIGS. 1A-1B illustrate a base station antenna that has four linear arrays, it will be appreciated that many modern base station antennas have much larger numbers of linear arrays. For example, many base station antennas now have six, eight, or ten linear arrays, or include multi-column arrays of radiating elements which have a pair of phase shifters for each column of the array.

As shown in FIG. 1A, the RET antenna 100 includes a radome 102, a mounting bracket 104, a bottom end cap 106 and a top end cap 120. A plurality of input/output ports 110 are mounted in the bottom end cap 106. Coaxial cables (not shown) may be connected between the input/output ports 110 and the RF ports on one or more radios (not shown). These coaxial cables may carry RF signals between the radios and the base station antenna 100. The input/output ports 110 may also include control ports that carry control signals to and from the base station antenna 100 from a base station control system (not shown) that may be located remotely from base station antenna 100. These control signals may include control signals for electronically changing the tilt angle of the antenna beams generated by the base station antenna 100.

For ease of reference, FIG. 1A includes a coordinate system that defines the length (L), width (T) and depth (V) axes (or directions) of the base station antenna 100 that will be discussed throughout the application. The length axis may also be referred to as the longitudinal axis.

FIG. 1B is a perspective view of the base station antenna of FIG. 1A with the radome 102 removed. As shown in FIG. 1B, the base station antenna 100 includes two linear arrays 120-1, 120-2 of low-band radiating elements 122 (i.e., radiating elements that transmit and receive signals in a lower frequency band) and two linear arrays 130-1, 130-2 of high-band radiating elements 132 (i.e., radiating elements that transmit and receive signals in a higher frequency band). Each of the low-band radiating elements 122 is implemented as a cross-polarized radiating element that includes a first dipole that is oriented at an angle of −45° with respect to the azimuth plane (a horizontal plane) and a second dipole that is oriented at an angle of +45° with respect to the azimuth plane. Similarly, each of the high-band radiating elements 132 is implemented as a cross-polarized radiating element that includes a first dipole that is oriented at an angle of −45° with respect to the azimuth plane and a second dipole that is oriented at an angle of +45° with respect to the azimuth plane. Since cross-polarized radiating elements are provided, each linear array 120-1, 120-2, 130-1, 130-2 will generate two antenna beams, namely a first antenna beam generated by the −45° dipoles and a second antenna beam generated by the +45° dipoles. The radiating elements 122, 132 extend forwardly from a backplane 112 which may comprise, for example, a sheet of metal that serves as a ground plane for the radiating elements 122, 132.

Figure 2:
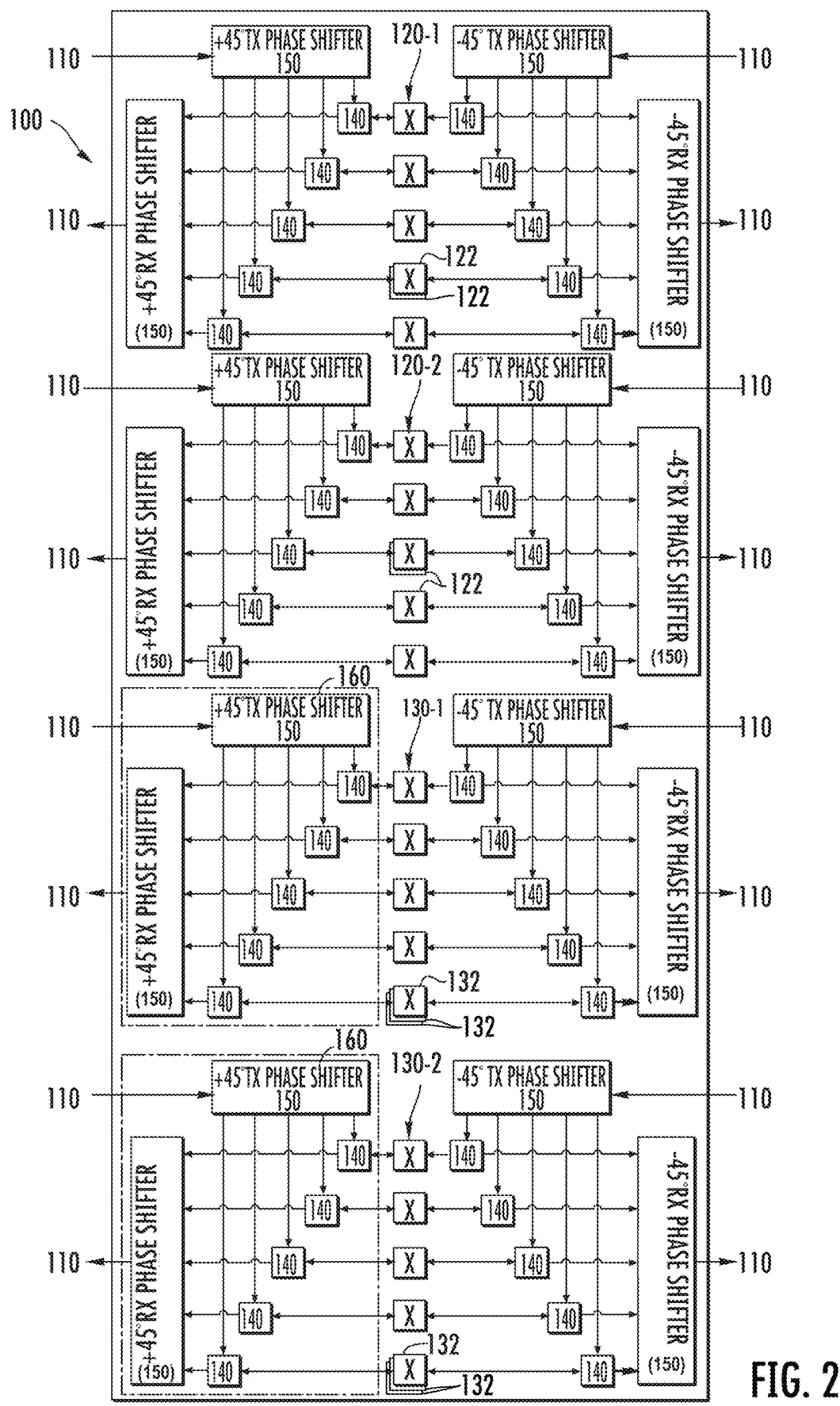
FIG. 2 is a schematic block diagram illustrating the electrical connections between various of the components of the base station antenna of FIGS. 1A-1B.

FIG. 2 is a schematic block diagram illustrating various additional components of the RET antenna 100 and the electrical connections therebetween. It should be noted that FIG. 2 does not show the actual location of the various elements on the antenna 100, but instead is drawn to merely show the electrical transmission paths between the various elements.

As shown in FIG. 2, each input/output port 110 may be connected to a phase shifter 150. The base station antenna 100 performs duplexing between the transmit and receive sub-bands for each linear array 120, 130 within the antenna (which allows different downtilts to be applied to the transmit and receive sub-bands), and hence each linear array 120, 130 includes both a transmit (input) port 110 and a receive (output) port 110. A first end of each transmit port 110 may be connected to the transmit port of a radio (not shown) such as a remote radio head. The other end of each transmit port 110 is coupled to a transmit phase shifter 150. Likewise, a first end of each receive port 110 may be connected to the receive port of a radio (not shown), and the other end of each receive port 110 is coupled to a receive phase shifter 150. Two transmit ports, two receive ports, two transmit phase shifters and to receive phase shifters are provided for each linear array 120, 130 to handle the two different polarizations.

Each transmit phase shifter 150 divides an RF signal input thereto into five sub-components, and applies a phase taper to these sub-components that sets the tilt (elevation) angle of the antenna beam generated by an associated linear array 120, 130 of radiating elements 122, 132. The five outputs of each transmit phase shifter 150 are coupled to five respective duplexers 140 that pass the sub-components of the RF signal output by the transmit phase shifter 150 to five respective sub-arrays of radiating elements 122, 132. In the example antenna 100 shown in FIG. 1A, FIG. 1B and FIG. 2, each low-band linear array 120 includes ten low-band radiating elements 122 that are grouped as five sub-arrays of two radiating elements 122 each. Each high-band linear array 130 includes fifteen high-band radiating elements 132 that are grouped as five sub-arrays of three radiating elements 132 each.

Each sub-array of radiating elements passes received RF signals to a respective one of the duplexers 140, which in turn route those received RF signals to the respective inputs of an associated receive phase shifter 150. The receive phase shifter 150 applies a phase progression to each received RF signal input thereto that sets the tilt angle for the receive antenna beam and then combines the received RF signals into a composite RF signal. The output of each receive phase shifter 150 is coupled to a respective receive port 110.

While FIG. 1B and FIG. 2 show an antenna having two linear arrays 120 of ten low-band radiating elements 122 each and two linear arrays 130 of fifteen high-band radiating elements 132 each, it will be appreciated that the number of linear arrays 120, 130 and the number of radiating elements 122, 132 included in each of the linear array 120, 130 may be varied. It will also be appreciated that duplexing may be done in the radios instead of in the antenna 100, that the number(s) of radiating elements 122, 132 per sub-array may be varied, that different types of radiating elements may be used (including single polarization radiating elements) and that numerous other changes may be made to the base station antenna 100 without departing from the scope of the present invention.

As can be seen from FIG. 2, the base station antenna 100 may include a total of sixteen phase shifters 150. While the two transmit phase shifters 150 for each linear array 120, 130 (i.e., one transmit phase shifter 150 for each polarization) may not need to be controlled independently (and the same is true with respect to the two receive phase shifters 150 for each linear array 120, 130), there still are eight sets of two phase shifters 150 that should be independently controllable. Accordingly, eight mechanical linkages may be required to connect the eight sets of phase shifters 150 to respective RET actuators.

Each phase shifter 150 shown in FIG. 2 may be implemented, for example, as a rotating wiper phase shifter. The phase shifts imparted by a phase shifter 150 to each sub-component of an RF signal may be controlled by a mechanical positioning system that physically changes the position of the rotating wiper of each phase shifter 150. It will be appreciated that other types of phase shifters may be used instead of rotating wiper phase shifters such as, for example, trombone phase shifters, sliding dielectric phase shifters and the like.

Figure 3A:
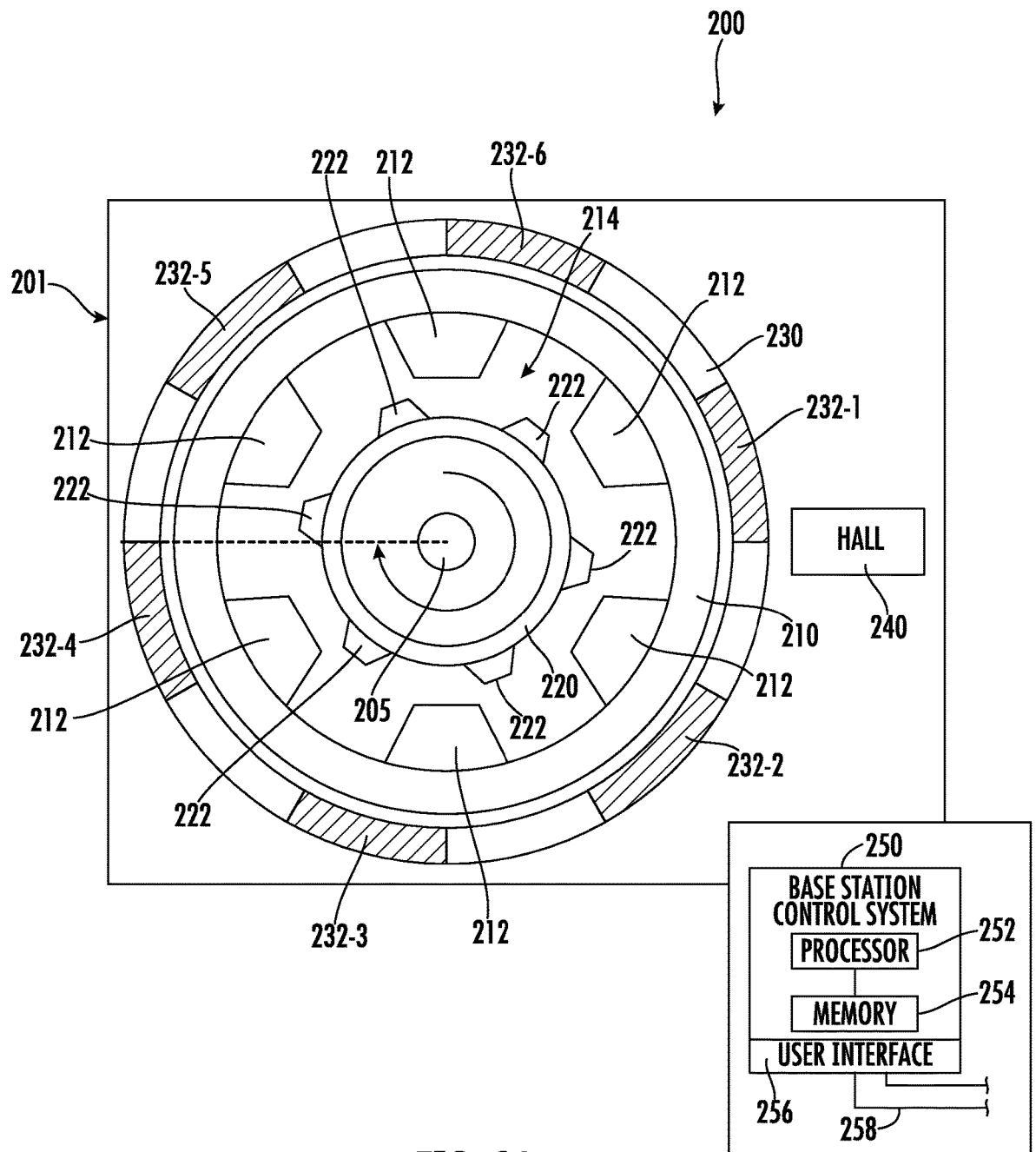
FIGS. 3A-3C are schematic diagrams of a motor system according to embodiments of the present invention illustrating when the motor is driving as normal (FIG. 3A), when the motor is decelerating (FIG. 3B), and when a pulse width modulation (PWM) of the motor is zero (FIG. 3C).
Figure 3B:
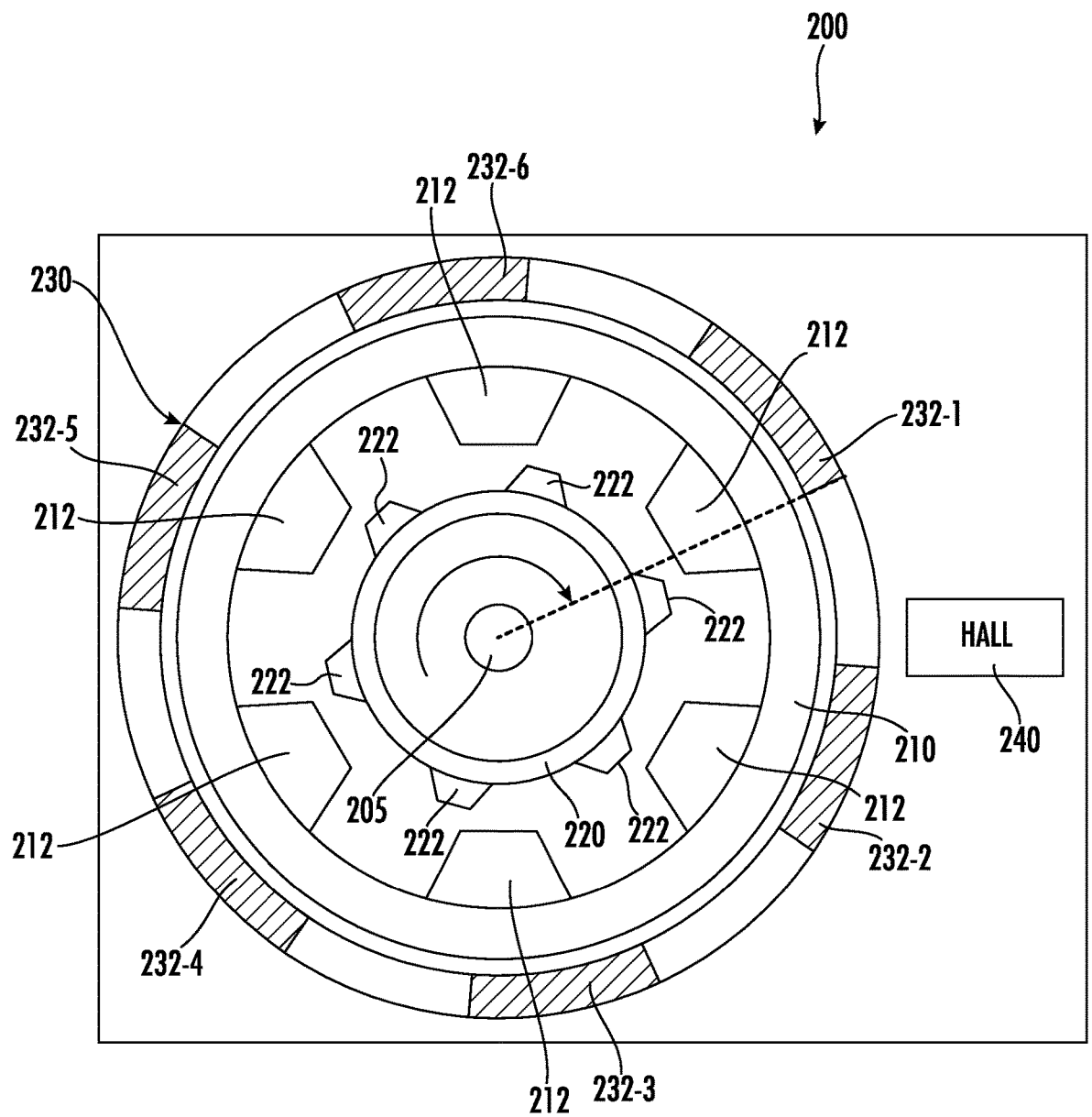
Figure 3C:
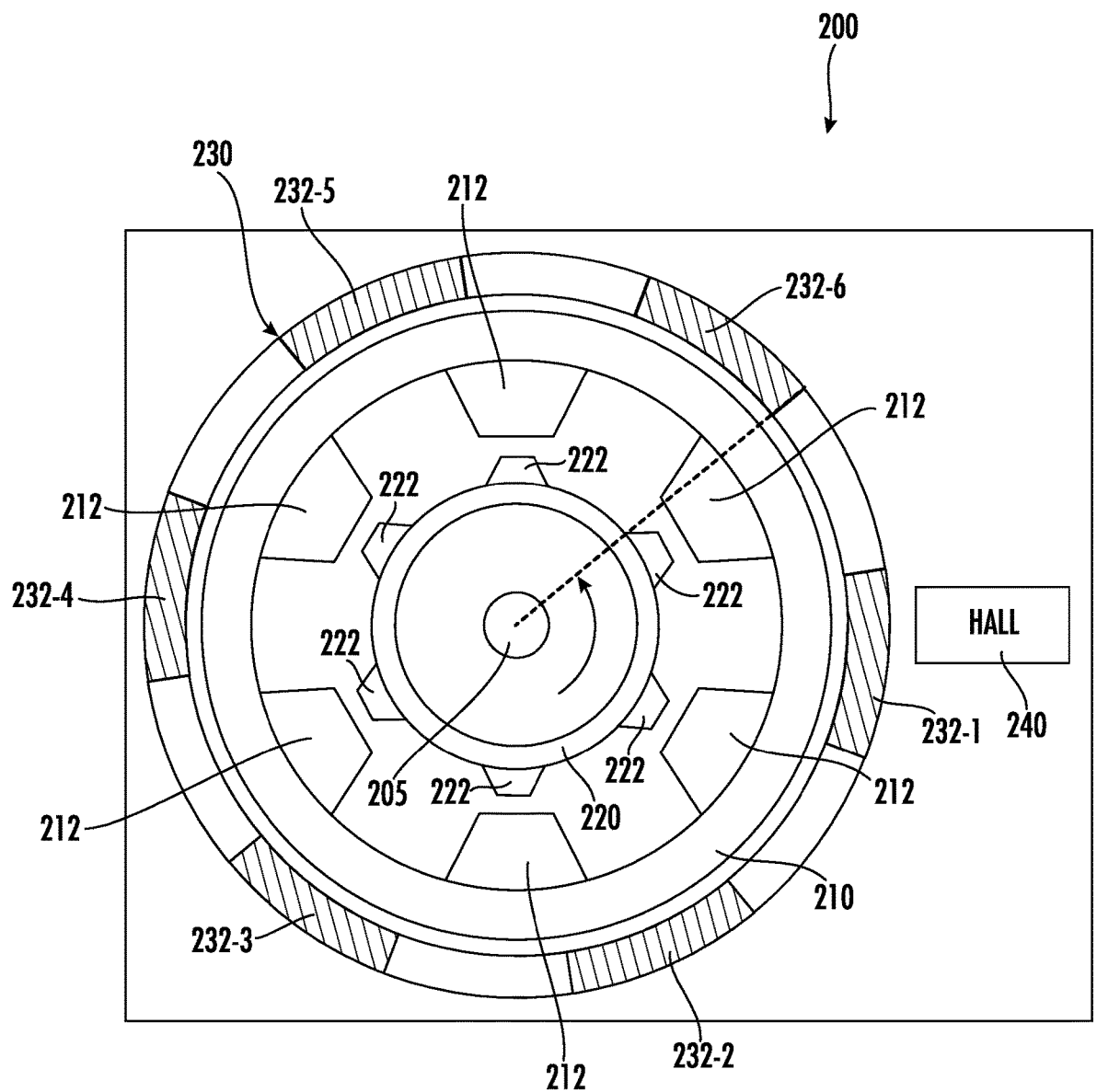

Referring to FIGS. 3A-3C, a motor system 200 for a multi-RET actuator system of a base station antenna according to embodiments of the present invention is illustrated. The motor system 200 is configured to drive one or more of the mechanical components (e.g., drive assemblies) of the RET-actuator to adjust a phase shifter assembly of the base station antenna as described herein. In some embodiments, the motor system 200 is a direct current (DC) motor system. Similar to other known DC motor systems, the motor system 200 of the present invention includes a stationary body (i.e., stator) 210 and a rotational body (i.e., rotor or armature) 220. The rotor 220 is configured to rotate within an interior cavity 214 of the stator 210. As shown in FIGS. 3A-3C, the stator 210 may comprise field windings 212 and the rotor 220 may comprise armature windings 222. A drive shaft 205 is coupled to the rotor 220 such that rotation of the rotor 220 causes simultaneous rotation of the drive shaft 205. The drive shaft 205 is coupled to one or more drive assemblies or other similar mechanical component(s) of the multi-RET actuator to effectuate an adjustment of a selected phase shifter(s) of the base station antenna.

As shown in FIGS. 3A-3C, the motor system 200 further comprises a HALL effect sensor (or HALL sensor) 240 which detects the positioning and speed of the DC motor (i.e., the position and speed of rotation of the rotor 220 with respect to the HALL sensor 240). In addition, the motor system 200 includes an annular disc 230 that surrounds the stator 210. In some embodiments, the annular disc 230 resides near a distal (or rear) end of the motor system 200. Similar to the drive shaft 205, the annular disc 230 is coupled to the rotor 220 such that rotation of the rotor 220 causes simultaneous rotation of the annular disc 230. The annular disc 230 comprises a plurality of magnets 232 (e.g., flywheel magnets) embedded therein. As shown in FIGS. 3A-3C, in some embodiments, the annular disc 230 may comprise six (6) magnets (i.e., 232-1 to 232-6). As described in further detail below, the plurality of magnets 232 are used to trigger the HALL effect sensor 240 (i.e., produce a step voltage) as the annular disc 230 rotates with the rotor 220. Each of the above described components of the motor system 200 may be contained within an outer housing 201.

As shown in FIG. 3A, in some embodiments, a base station control system 250 may control operation of the antenna 100 as is known in the art. The base station control system 250 may also control operation of (be in communication with) the motor system 200 of the multi-RET actuator. Communications cables 258 may be used to deliver control signals from the base station control system 250 to the motor system 200 and motor system 200 to the base station control system 250.

In some embodiments, the base station control system 250 may comprise a processor 252 communicably coupled to such devices as a memory 254 and a user interface 256. The processor 252 generally includes circuitry for implementing communication and/or logic functions of the antenna. The processor 252 may include functionality to operate one or more software programs, which may be stored in the memory 254. The base station control system 250 may be located remotely from the antenna 100, may be collocated with the antenna 100 or various functions of the base station control system 250 may be allocated between the antenna and a remote location.

As used herein, a "processor" refers to a device or combination of devices having circuitry used for implementing the communication and/or logic functions of the system. For example, the processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in memory 254. As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory" generally refers to a device or combination of devices that store one or more forms of computer-readable media for storing data and/or computer-executable program code/instructions. For example, in one embodiment, the memory 254 as described herein includes any computer memory that provides an actual or virtual space to temporarily or permanently store data and/or commands provided to the processor 252 when the processor carries out its functions described herein. As used herein, "memory" includes any computer readable medium configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The user interface 256 may be made up of user output devices and/or user input devices, which are operatively coupled to the processor 252. The user output devices may include a visual display, audio device and/or the like. The user input devices may include any of a number of devices allowing the base station control system 250 to receive data, such as a keypad, keyboard, touch-screen, touchpad, microphone, mouse, joystick, other pointer device, button, soft key, and/or other input device(s).

Figure 4A:
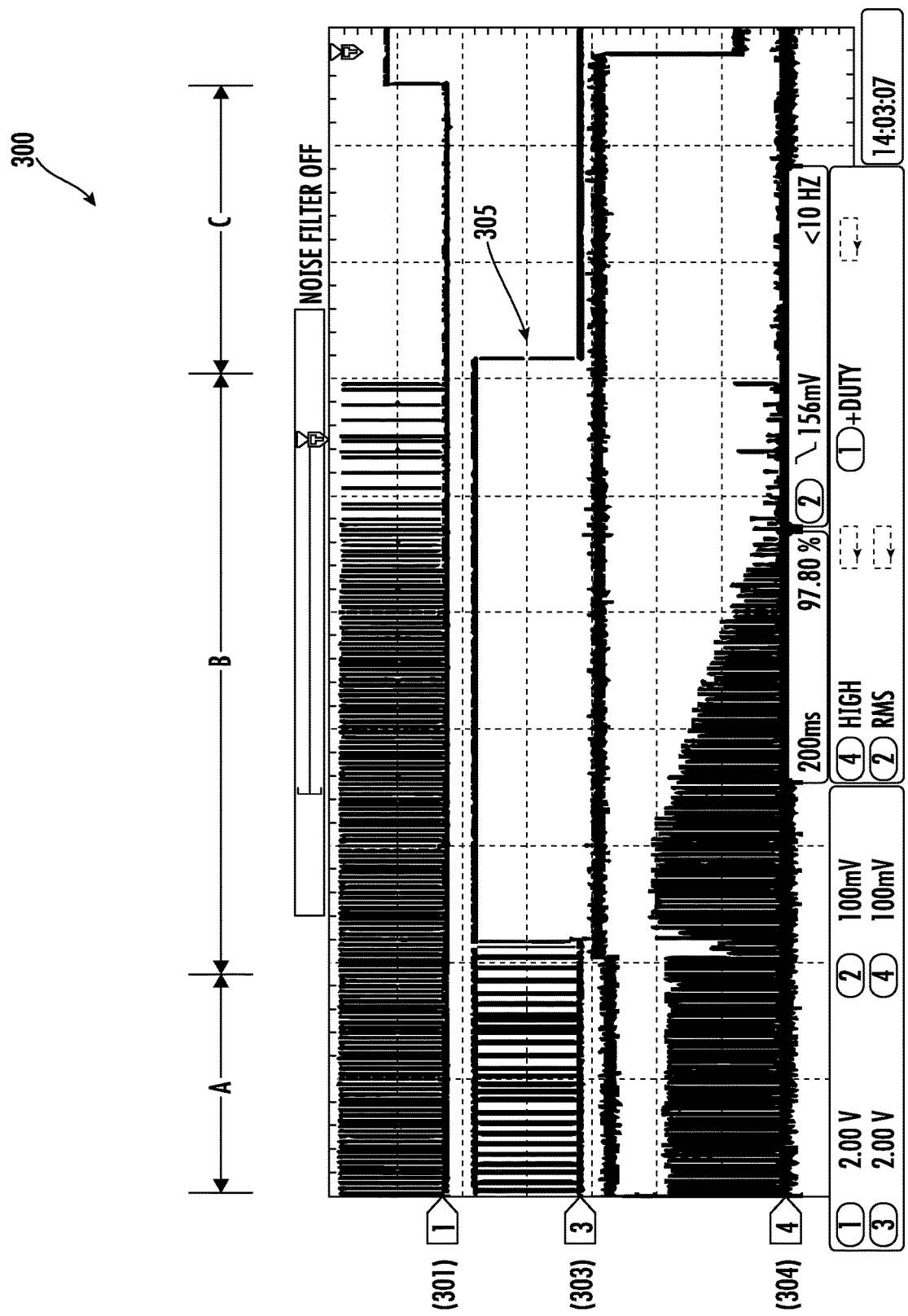
FIG. 4A-4B illustrates exemplary electrical parameters at the different stages for the motor system shown in FIGS. 3A-3C.
Figure 4B:
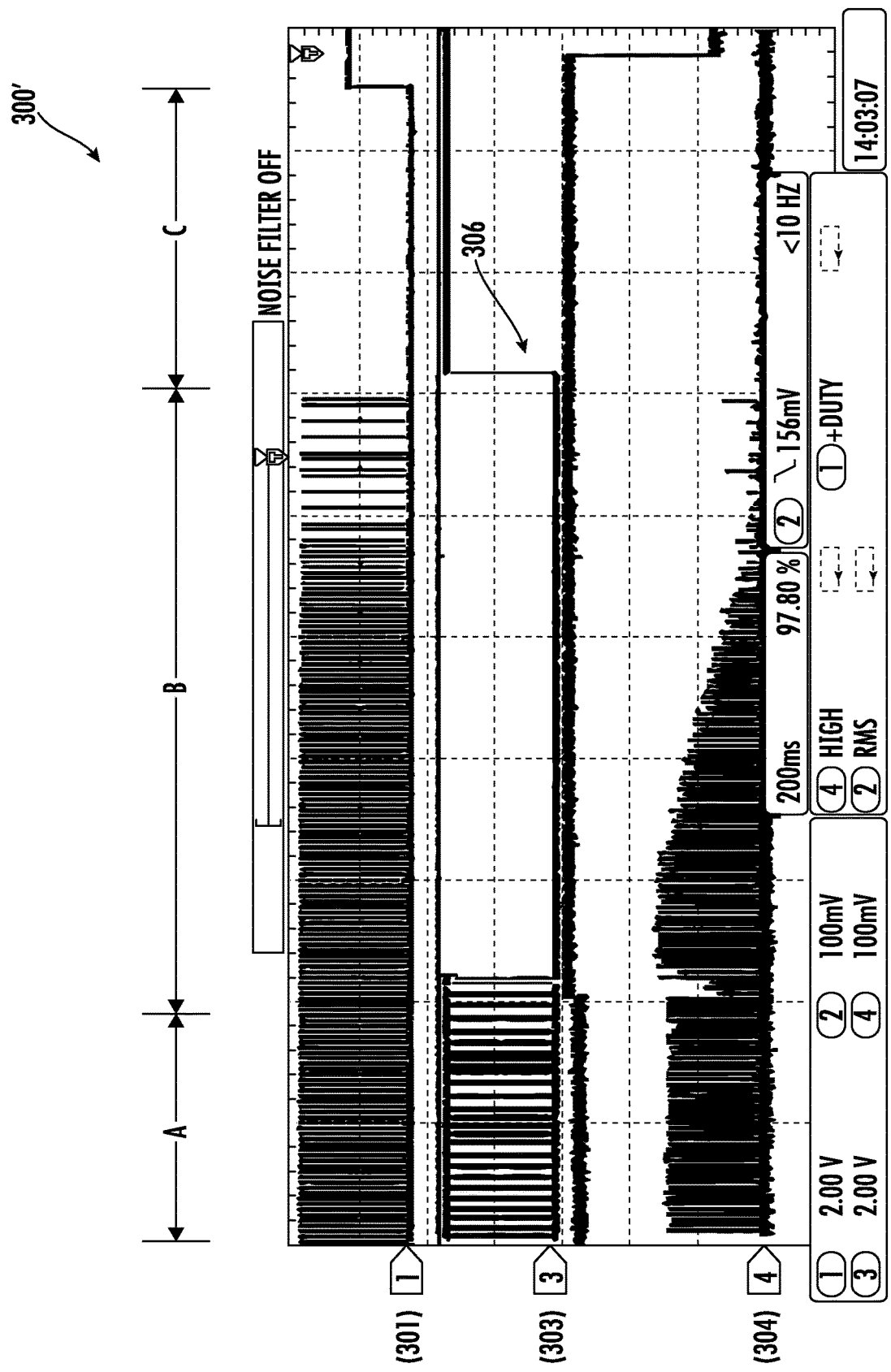

During operation of the motor system 200, the HALL effect sensor 240 produces a step voltage when it detects the passing of the rotating magnets 232 coupled to the rotor 220 (i.e., as the annular disc 230 rotates with the rotor 220 and each magnet 232 passes the HALL sensor 240) (see, e.g., FIGS. 4A-4B). One complete HALL sensor step voltage is detected when two edges of a respective magnet 232 rotates past the HALL sensor 240. A control software (e.g., stored in memory 254) is configured to count the steps to accurately determine the position and speed of the rotor 220 of the motor system 200 as it rotates within the stator 210. Typically, the rotor 220 is driven (i.e., rotated) at higher speeds in order to perform the desired phase shifter adjustment within the two minute industry standard for maximum movement time (e.g., 3GPP and AISG). As described in further detail below, after the motor system 200 is de-energized (i.e., shutdown) at a high speed and the rotor 220 coasts and slows down, a reverse rotation at a slow-stop phase may occur when the rotor 220 realigns with the magnet poles of the stator 210. For example, if one of the magnets 232 within the annular disc 230 is positioned on or adjacent to the HALL effect sensor 240 when the rotor 220 and annular disc 230 come to a complete stop, a false HALL step (e.g., an additional pulse) may be generated (e.g., by a reverse rotation of the rotor 220) which can cause position inaccuracies with respect to the desired phase shifter adjustment. For example, the drive assembly coupled to the motor system 200 may over- or under-adjust the position of the phase shifter based on the interaction of the rotor 220 (and magnets 232) and the HALL sensor 240. The more magnets 232 that are included within the motor system 200, the higher the chance of a false HALL step being generated. Methods for preventing these position inaccuracies with respect to the phase shifter(s) are described herein.

Position control of the motor system 200 according to embodiments of the present invention may be divided into three stages, i.e., Stage (A), Stage (B), and Stage (C), which are shown in FIGS. 3A-3C and FIGS. 4A-4B. FIG. 3A illustrates Stage (A) with the motor system 200 being driven as normal (e.g., at a reduced speed) necessary to move the mechanical components of the multi-RET actuator (e.g., a selected drive assembly) to perform the phase shifter adjustment. The various mechanical subassemblies coupled to the rotor 220 of the motor system 200 to move the drive assembly (e.g., tilt adjuster) produce a mechanical load in the overall motor system 200. As shown in FIG. 3A, while the rotor 220 and annular disc 230 rotate simultaneously, the poles of the magnets 232 do not necessarily align with the rotor 220 (i.e., align with the armature windings 222 of the rotor 220) and may not be consistent from unit to unit.

The motor system 200 is operated at reduced speeds during the start and end stages of positioning the drive assembly (e.g., tilt adjuster). At the start stage (i.e., Stage A), when the drive assembly is in a stand-still state, the reduced speed is the minimum speed necessary to produce the initial torque to move the drive assembly without stalling the motor system 200. In many instances, if higher speeds are used during this start stage, the motor system 200 will stall. Once the motor system 200 is rotating and the drive assembly begins to gain momentum, the speed of the system 200 can then be slowly increased (or accelerated) to a higher operating speed in order to meet the two minute industry standard (e.g., 3GPP and AISG).

At the end stage (i.e., Stage C), the system 200 must decelerate from the higher operating speed back to the reduced speed to accurately position the drive assembly (and corresponding phase shifter) at its final target position (i.e., without over- or under-adjusting the position of the drive assembly and tilt of the phase shifter from the targeted/commanded final position). It is noted that accelerating and decelerating of the motor system 200 is not used when a short distance tilt change is needed (e.g., 3.1 degrees to 4.1 degrees of tilt adjustment). Instead, the motor system 200 is driven at a constant reduced speed for shorter distance tilt adjustments. For example, in some embodiments, the rotor 220 may be rotating at a reduced speed of 5 to 8 edges per interval (i.e., rising or falling edges of the HALL sensor step voltage signal).

FIG. 3B illustrates Stage (B), after the motor system 200 has been de-energized and the rotor 220 is coasting as its rotation slows down and the speed of the motor system 200 is being reduced toward a target speed of zero (i.e., speed=0). The motor system 200 utilizes controlled non-friction braking by reducing a pulse width modulation (PWM) to a minimum which slowly decreases the voltage being delivered at the armature (i.e., to the armature windings 222 of the rotor 220), even when speed=0 is attained. This allows the rotor 220 of the motor system 200 to be "pushed" to a "natural" resting place with minimal force against the mechanism, as shown in FIG. 3B. The natural resting place of the motor system 200 is when the rotor 220 and stator 210 teeth are aligned (e.g., the armature windings 222 of the rotor 220 and the field windings 212 of the stator 210 are aligned), thereby creating the least resistance within the motor system 200.

FIG. 3C illustrates Stage (C), when the PWM is zero (i.e., PWM=0) and both motor terminals (i.e., rotor 220 and stator 210) have been grounded. When the rotor 220 comes to a complete stop, the rotor 220 may experience a counter (or reverse) rotation opposite to the rotation the rotor 220 was being driven (i.e., "snap back") from the load weight and/or elasticity of the motor system 200. The control software (e.g., stored in memory 254) monitors feedback from the HALL sensor 240 and measures any counter rotation detected from the rotor 220 snapping back to its final position.

FIGS. 4A-4B illustrates exemplary electrical parameters 300, 300' with respect to the pulse width modulation (PWM), armature voltage, and HALL sensor (voltage) steps at each of the three stages for the motor system 200 as described herein (i.e., Stages (A), (B), and (C)). The top electrical parameter (i.e., channel 1 or 301) reflects the output PWM for the motor system 200. The middle electrical parameter (i.e., channel 3 or 303) reflects the HALL sensor steps for the motor system 200. The bottom electrical parameter (i.e., channel 4 or 304) reflects armature voltage being supplied to the rotor 220.

The motor system 200 and control software includes microcontrollers GPIO (General Purposes Input Output) digital circuitry that provides edge detection capabilities. The circuitry can detect a falling edge 305 or a rising edge 306 (see, e.g., FIGS. 4A-4B) of any input step voltage by delaying the input signal in combination with internal digital logic gates. If the control software detects an extra HALL sensor step, one of the magnets 232 is on a detection boundary (i.e., adjacent to or aligned with the HALL sensor 240). If the control software detects a falling edge transition 305, for example, as shown in FIG. 4A, the rotor 220 snapped or fell backwards (i.e., experienced a counter rotation) off the HALL sensor 240. If the control software detects a rising edge transition 306, for example, as shown in FIG. 4B, the rotor 220 snapped or fell backwards (i.e., experienced a counter rotation) onto the HALL sensor 240.

As shown in FIG. 4A, when the motor system 200 is being driven as normal, i.e., at a reduced speed during Stage (A), the output PWM 301 and armature voltage 304 are being supplied a constant rate (or duty cycle) and the HALL sensor 240 detects a step voltage 303 as the edges of the magnets 232 coupled to the rotor 220 rotate pass the HALL sensor 240. During Stage (B), the output PWM 301 is reduced to a minimum which slowly decreases the armature voltage 304 and thus, reduces the speed of rotation of the rotor 220 (and coupled annular disc 230 and embedded magnets 232). The HALL sensor 240 continues to detect a step voltage 303 as the rotation of the rotor 220 (and magnets 232) slows down and the speed of the motor system 200 reduces toward a target speed of zero (i.e., speed=0). At Stage (C), the PWM has been reduced to zero (i.e., PWM=0) and both motor terminals (i.e., rotor 220 and stator 210) have been grounded (i.e., no armature voltage). In the exemplary electrical parameters 300 shown in FIG. 4A, a falling edge transition 305 is shown in the boundary between Stage (B) and Stage (C) which indicates that the rotor 220 snapped or fell backwards (i.e., experienced a counter rotation) off the HALL sensor 240, as described herein. In the exemplary electrical parameters 300 shown in FIG. 4B, a rising edge transition 306 is shown in the boundary between Stage (B) and Stage (C) which indicates that the rotor 220 snapped or fell backwards (i.e., experienced a counter rotation) onto the HALL sensor 240, as described herein.

Methods for controlling the position and speed of the motor system 200 according to embodiments of the present invention will now be described with reference to FIGS. 5-7. As described herein, interactions between the rotor 220/magnets 232 and HALL effect sensor 240 within the motor system 200 may cause position inaccuracies to occur with respect to the corresponding phase shifter being adjusted. The drive assembly coupled to the motor system 200 may over- or under-adjust the phase shifter(s) relative to the desired phase shift based on these interactions. The positioning of the rotor 220 is tracked by counting any additional detected edges (i.e., detected edges of the rotating magnets 232 with respect to the HALL sensor 240). For example, additional detected edges (e.g., false HALL sensor steps from a falling edge transition 305 or rising edge transition 306) may add to a total travel distance of the drive assembly needed to reach a target position. This added distance can result in an over adjustment of the phase shifter coupled to the drive assembly. One complete HALL sensor step (e.g., as shown in middle channel 303 in FIGS. 4A-4B) implies two detected edges of a respective magnet 232. Position inaccuracies from a false HALL sensor step (i.e., raising or falling edge transition 305, 306) may be accrued and result position inaccuracies with respect to the targeted tilt change adjustments for the corresponding phase shifter(s). Embodiments of the present invention provide for methods of controlling the position and speed of the motor system to mitigate or eliminate these position inaccuracies of the phase shifter(s).

Figure 5:
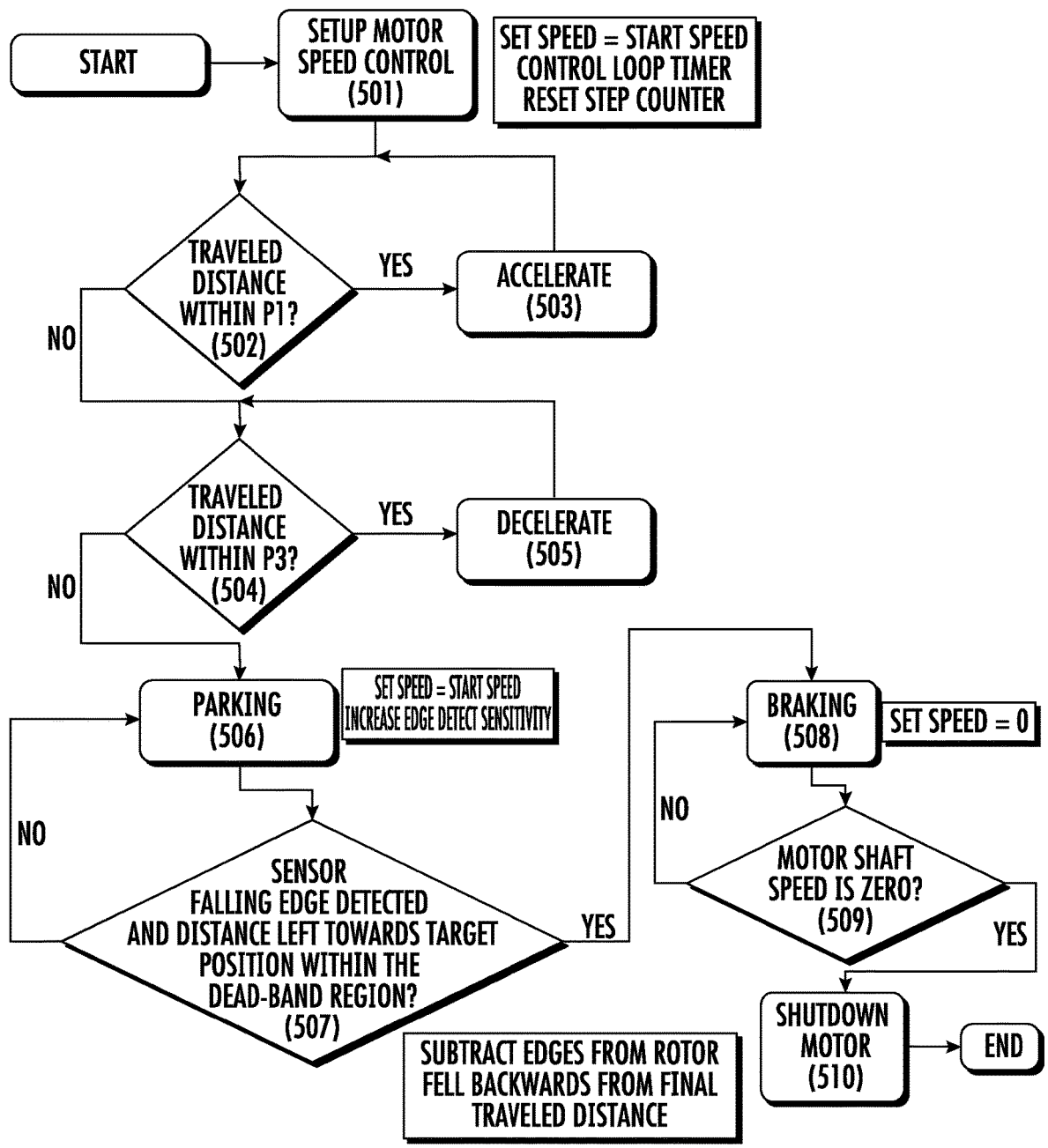
FIG. 5 is a flow chart illustrating the software logic for controlling the position and speed of the motor system of FIGS. 3A-3C according to embodiments of the present invention.
Figure 6:
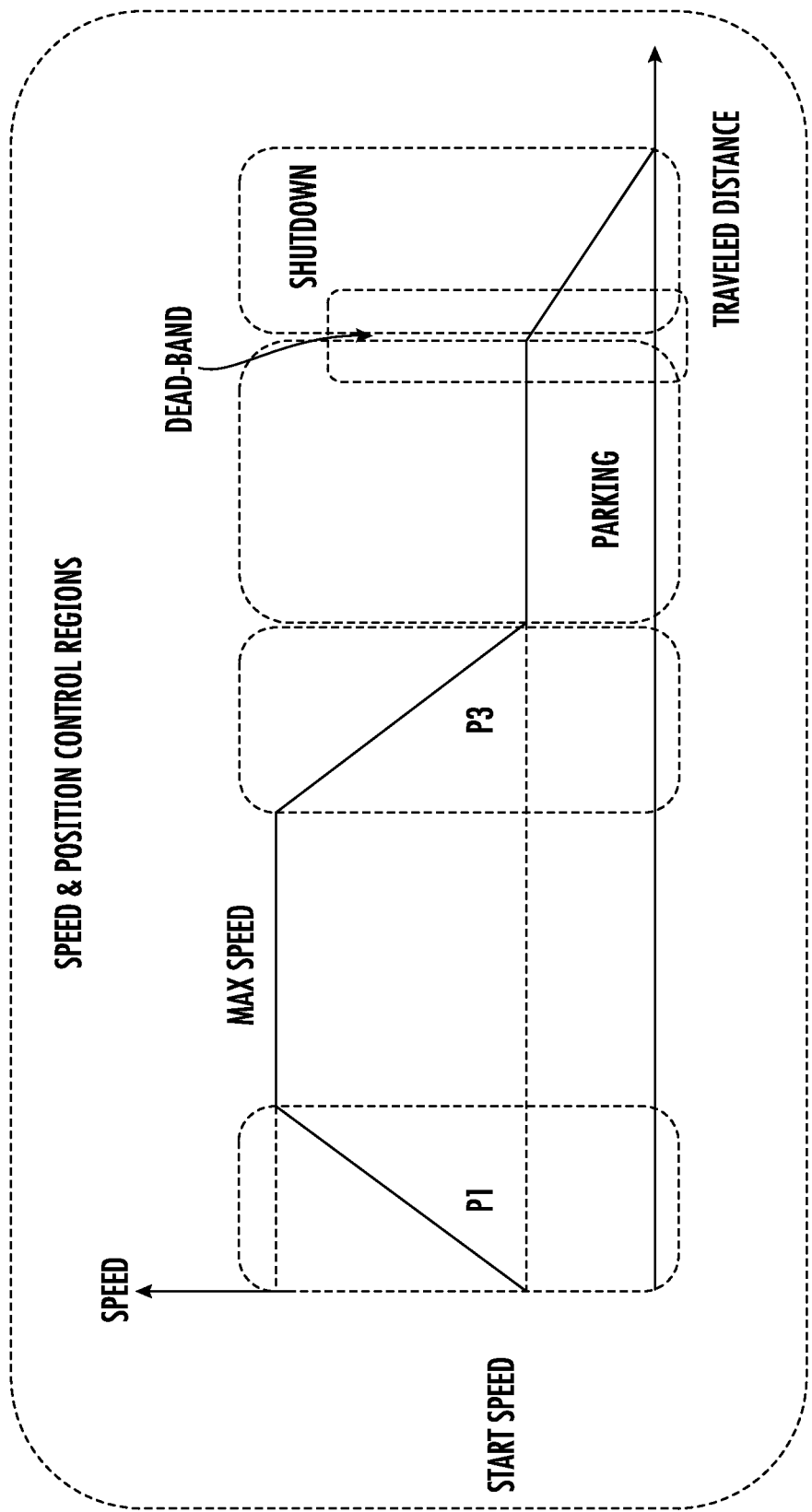
FIG. 6 is a graph illustrating the speed and position control regions according to embodiments of the present invention with respect to the motor system of FIGS. 3A-3C.

FIG. 5 is a flow chart illustrating an exemplary software logic for controlling the speed and position of the motor system 200 according to embodiments of the present invention. FIG. 6 is a graph illustrating exemplary speed and position control regions with respect to the motor system 200 according to embodiments of the present invention. FIG. 7 illustrates exemplary operation of the motor speed controller of the motor system 200 according to embodiments of the present invention.

When an input signal or command is received to adjust the position (i.e., target position) of a phase shifter assembly (e.g., from the base station control system 250), an initial motor speed is set for the motor system 200 [Block 501]. Prior to initiating movement of the motor system 200 (i.e., rotation of the rotor 220), the control software (e.g., stored in memory 254 of the base station control system 250) computes a first intermediate distance P1, a second intermediate distance P3, a parking distance, a shutdown distance, and a "dead-band" distance (see, e.g., FIG. 6). Each of these distances are deduced from the total travel distance needed for a selected drive assembly (e.g., tilt adjuster) of the multi-RET actuator to reach the next target position for the phase shifter assembly coupled thereto. In some embodiments, the dead-band distance is fixed at a constant number of HALL sensor edges. In some embodiments, the parking distance is deduced/computed based on a constant five (5) second movement duration. In some embodiments, the motor speed may be controlled by a motor speed controller 400 in communication with the rotor 220 and the HALL sensor 240 (see, e.g., FIG. 7). In some embodiments, the motor speed controller 400 may be integral with the base station control system 250. For example, in some embodiments, the motor speed controller 400 is a software-based controller and may be incorporated into the base station control system 250 software application.

Figure 7:
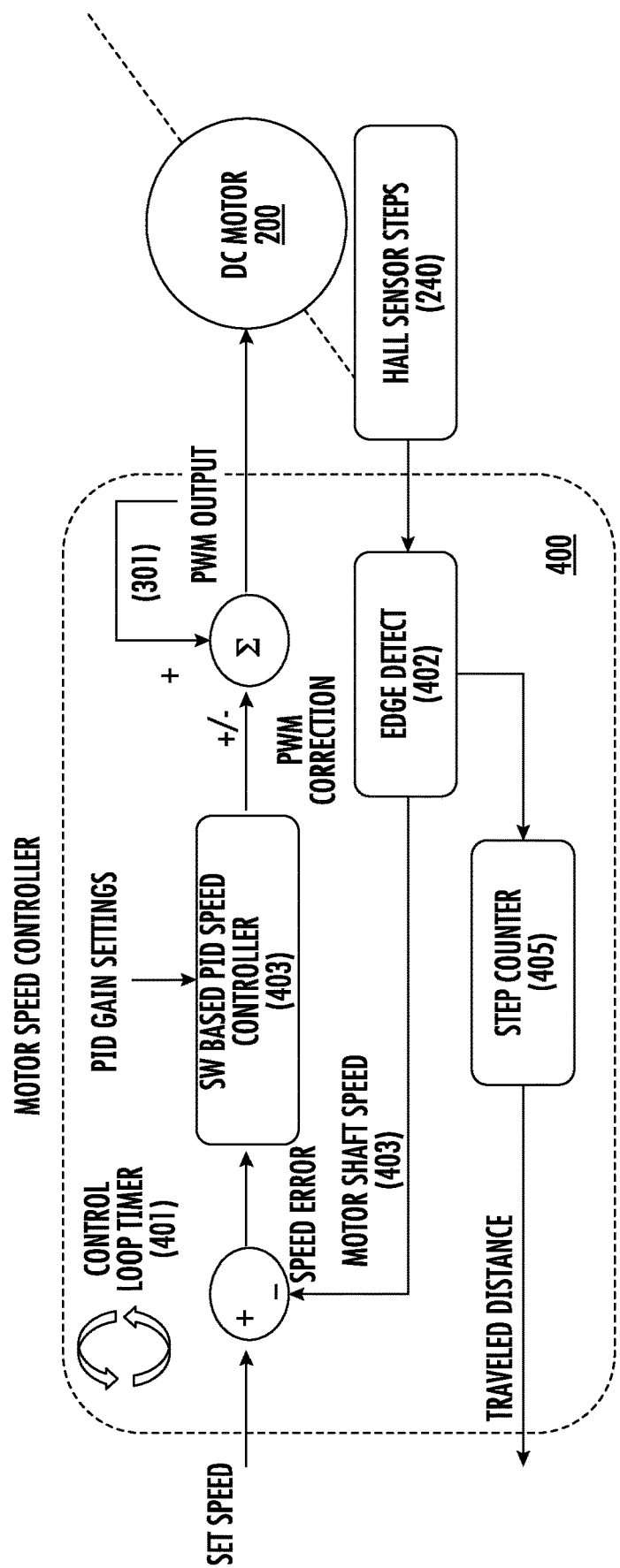
FIG. 7 illustrates exemplary operation of the motor speed controller of the motor system of FIGS. 3A-3C according to embodiments of the present invention.

As shown in FIG. 7, the motor speed controller 400 may comprise a control loop timer 401. The motor speed controller 400 is configured to control the acceleration and deceleration of the motor system 200 (i.e., rotation of the rotor 220) through a software-based proportional integral derivative (PID) speed controller 403. The PID speed controller 403 is configured to measure the current speed of the motor (rotor 220) and compare the measured speed with the desired speed of the motor system 200. The PID speed controller 403 is configured to increase or decrease the PWM output 301 to accelerate or decelerate the speed of the motor system 200. As described herein, during operation of the motor system 200, the HALL effect sensor 240 produces a step voltage when it detects the passing edges of the rotating magnets 232 coupled to the rotor 220 (i.e., as the annular disc 230 rotates with the rotor 220 and each magnet 232 passes the HALL sensor 240). One step voltage implies two detected edges. In some embodiments, the motor speed controller 400 includes an edge detector 402 which is configured to communicate with the HALL sensor 240 to detect the edges of the magnets 232 as the magnets 232 rotate past the HALL sensor 240. A step counter 405 within the motor speed controller 400 counts the step voltage detected by the edge detector 402. Edge detection of the magnets 232 may be used to accurately determine the position and speed of the rotor 220 of the motor system 200 as it rotates within the stator 210 which may be used to calculate the total traveled distance of the drive assembly. For example, based on the edge detection of the passing magnets 232 as the magnets rotate past the HALL sensor 240, the PWM output 301 may be increased or decreased via the PID speed controller 403 to accelerate or decelerate the motor speed in order to achieve a target position of drive assembly and corresponding phase shifter(s). The PWM output 301 may be derived by dividing the detected edges of the magnets 232 over the control loop timing period (i.e., control loop timer 401).

The control software continuously monitors the current traveled distance of the selected drive assembly against the computed first and second intermediate distance locations P1, P3 to determine whether acceleration or deceleration of the motor system 200 is needed [Block 502]-[Block 505]. Acceleration of the motor speed occurs within the first intermediate distance P1 as the drive assembly begins to gain momentum to keep the phase shifter adjustment within the two minute industry standard for maximum movement time discussed herein (e.g., 3GPP and AISG) [Block 503]. Acceleration of the motor speed will continue to increase until a pre-determined maximum speed of the motor system 200 has been achieved (i.e., set speed) in order to achieve the desired phase adjustment [Block 503] (see also, e.g., FIG. 6). As described in further detail below, deceleration of the motor speed is used to accurately position the drive assembly in the final target position of the phase shifter assembly to achieve the desired phase adjustment [Block 505]. In some embodiments, when the desired adjustment of the phase shifter is only a short distance, the control software sets the first and second intermediate distances P1, P3 to zero and operates the motor system 200 at its slowest speed setting. For example, in some embodiments, the first and second intermediate distances P1, P3 are set to zero when the control software determines that the total travel distance is within a deduced distance based on a five second movement time (i.e., five seconds is the parking time) at constant reduced speed. In some embodiments, motor system 200 may be operating at a reduced speed of 10 to 20 edges per interval depending on the subassembly being driven. In some embodiment, the drive assembly (e.g., tilt adjuster) may have a reduced speed set to 10 edges per interval. The speed may be based on the HALL sensor edges per every 28 milliseconds or the period of the control loop timer 401.

As the traveled distance of the drive assembly (e.g., the tilt adjuster) reaches the second intermediate distance P3, the motor speed is decelerated [Block 506] (see also, e.g., FIG. 6) to begin preparing for parking and shutdown of the motor system 200. At this time, the control software increases the edge detection sensitivity with respect to the interactions between the magnets 232 and the HALL effect sensor 240 as the rotation of the rotor 220 slows down. The control software continuously monitors the magnet 232 edge detection (i.e., edge detector 402 in FIG. 7) to determine if any falling edge transition (i.e., 305 in FIG. 4A) or rising edge transition (i.e., 306 in FIG. 4B) is detected and/or whether the travel distance remaining to achieve the final target position of the phase shifter assembly is within the computed dead-band region [Block 507]. If the remaining travel distance is within the dead-band region, the motor speed controller 400 sets the motor speed to zero (i.e., speed=0) and the motor system 200 is shutdown [Block 508]-[Block 510]. Any edge (falling or rising) transition adds to the overall traveled distance of the drive assembly to achieve the final target position of the phase shifter assembly, thereby resulting in position inaccuracy. If a falling edge or rising edge transition is detected, the control software subtracts the added distance from the total travel distance to achieve the final target position of the phase shifter assembly, and thus, avoiding position inaccuracy [Block 510].

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of controlling the position and speed of a motor system for a multi-RET actuator system, the multi-RET actuator system comprising a plurality of drive assemblies, each drive assembly operatively connected to a phase shifter assembly such that movement of the drive assembly adjusts the respective phase shifter assembly, a direct current motor system coupled to the plurality of drive assemblies, the motor system comprising a rotor configured to rotate within an interior cavity of a stator, a drive shaft coupled to the rotor and to the plurality of drive assemblies, an annular disc surrounding the stator, the annular disc is coupled to the rotor such that rotation of the rotor causes simultaneous rotation of the annular disc; a plurality of spaced apart magnets embedded within the annular disc; and a HALL effect sensor, the method comprising:
    accelerating rotation of the rotor and annular disc to move a selected drive assembly of the plurality of drive assemblies a total travel distance to reach a target position;
    monitoring a step voltage produced by the HALL effect sensor as the annular disc and plurality of magnets rotate past the HALL effect sensor;
    decelerating rotation of the rotor and annular disc;
    measuring the step voltage produced by the HALL effect sensor to determine if a counter-rotation of the rotor is detected after the rotor comes to a complete stop; and
    subtracting a distance added by the counter-rotation of the rotor from the total travel distance for the selected drive assembly to reach the target position.

2. The method according to claim 1, wherein an extra HALL step voltage is detected when the rotor comes to a complete stop and one of the plurality of magnets is adjacent to or aligned with the HALL effect sensor.

3. The method according to claim 1, wherein a falling edge transition is detected when the rotor experiences a counter rotation off the HALL effect sensor after the rotor comes to a complete stop.

4. The method according to claim 1, wherein a rising edge transition is detected when the rotor experiences a counter rotation onto the HALL effect sensor after the rotor comes to a complete stop.

5. The method according to claim 1, wherein prior to initiating rotation of the motor system, the method further comprises calculating a first intermediate distance and a second intermediate distance relative to the total travel distance of the selected drive assembly.

6. The method according to claim 1, wherein the acceleration and deceleration of the motor system is controlled by a motor speed controller in communication with the rotor and the HALL effect sensor.

7. The method according to claim 1, wherein deceleration of the rotor and annular disc is controlled by reducing a pulse width modulation delivered to the rotor.

8. The method according to claim 1, wherein acceleration of the motor system increases until a pre-determined maximum speed of the motor system has been achieved.

9. The method according to claim 1, further comprising:
    calculating a dead-band region relative to the total travel distance of the selected drive assembly; and
    shutting down the motor system when the total travel distance of the selected drive assembly is within the dead-band region.

10. A method for controlling the position and speed of a motor system for a multi-RET actuator system, the multi-RET actuator system comprising a plurality of drive assemblies, each drive assembly operatively connected to a phase shifter assembly such that movement of the drive assembly a total travel distance adjusts the respective phase shifter assembly to a target position, a direct current motor system coupled to the plurality of drive assemblies, the motor system comprising a rotor configured to rotate within an interior cavity of a stator, a drive shaft coupled to the rotor and to the plurality of drive assemblies, an annular disc surrounding the stator, the annular disc is coupled to the rotor such that rotation of the rotor causes simultaneous rotation of the annular disc; a plurality of spaced apart magnets embedded within the annular disc; and a HALL effect sensor, the method comprising:
    calculating a first intermediate distance and a second intermediate distance relative to the total travel distance of a selected drive assembly of the plurality of drive assemblies;
    accelerating rotation of the rotor and annular disc to move the selected drive assembly of the plurality of drive assemblies within the first intermediate distance;
    counting a step voltage produced by the HALL effect sensor as the rotor and annular disc rotate past the HALL effect sensor to calculate a current travel distance of the selected drive assembly;
    decelerating rotation of the rotor and annular disc when the current travel distance of the selected drive assembly reaches the second intermediate distance;
    calculating a dead-band region relative to the total travel distance of the selected drive assembly;
    shutting down the motor system when the total travel distance of the selected drive assembly is within the dead-band region;
    measuring the step voltage produced by the HALL effect sensor to determine if a counter-rotation of the rotor is detected after the rotor comes to a complete stop; and
    subtracting a distance added by the counter-rotation of the rotor from the total travel distance for the selected drive assembly to reach the target position.

11. The method according to claim 10, wherein an extra HALL step voltage is detected when the rotor comes to a complete stop and one of the plurality of magnets is adjacent to or aligned with the HALL effect sensor.

12. The method according to claim 10, wherein a falling edge transition is detected when the rotor experiences a counter rotation off the HALL effect sensor after the rotor comes to a complete stop.

13. The method according to claim 10, wherein a rising edge transition is detected when the rotor experiences a counter rotation onto the HALL effect sensor after the rotor comes to a complete stop.

14. The method according to claim 10, wherein the total travel distance of the drive assembly is simultaneously monitored against the calculated first and second intermediate distances to determine whether acceleration or deceleration of the motor system is needed.

15. The method according to claim 10, wherein the acceleration and deceleration of the motor system is controlled by a motor speed controller in communication with the rotor and the HALL effect sensor.

16. The method according to claim 10, wherein deceleration of the rotor and annular disc is controlled by reducing a pulse width modulation delivered to the rotor.

17. The method according to claim 10, wherein acceleration of the motor system increases within the calculated first intermediate distance until a pre-determined maximum speed of the motor system is achieved.

18. The method according to claim 10, further comprising increasing edge detection sensitivity with respect to the plurality of magnets rotating past the HALL effect sensor during deceleration of the motor system.

19. A motor system for a multi-RET actuator system, the motor system comprising:
   a rotor configured to rotate within an interior cavity of a stator, the rotor comprises armature windings and the stator comprises field windings;
   a drive shaft coupled to the rotor and to a drive assembly of the multi-RET actuator system;
   an annular disc surrounding the stator, the annular disc is coupled to the rotor such that rotation of the rotor causes simultaneous rotation of the annular disc;
   a plurality of spaced apart magnets embedded within the annular disc;
   a HALL effect sensor; and
   a motor speed controller in communication with the rotor and the HALL effect sensor, the motor speed controller comprising:
      a proportional integral derivative (PID) speed controller configured to control a PWM output to the rotor;
      an edge detector in communication with the HALL effect sensor to detect when the magnets rotate past the HALL effect sensor; and
      a step counter configured to count a step voltage produced by the HALL effect sensor.

20. The motor system according to claim 19, wherein the motor speed controller further comprises a control loop timer.

21. The motor system according to claim 19, wherein the PID speed controller increases or decreases the PWM output to accelerate or decelerate the speed of the motor system.

* * * * *